United States Patent Office 3,391,148
Patented July 2, 1968

3,391,148
REACTION PRODUCTS OF CYCLIC-SUBSTITUTED
NAPHTHOLACTAMS AND ARYLAMINES
Alfred Brack and Roderich Raue, Leverkusen, Germany,
assignors to Farbenfabriken Bayer Aktiengesellschaft,
Leverkusen, Germany, a German corporation
No Drawing. Filed Apr. 1, 1965, Ser. No. 444,838
Claims priority, application Germany, Apr. 10, 1964,
F 42,587
16 Claims. (Cl. 260—288)

ABSTRACT OF THE DISCLOSURE

Novel azo dyestuffs useful particularly in the dyeing and printing of acrylonitrile containing fibers are prepared from cyclic substituted naphtholactams and arylamines and have the general formula:

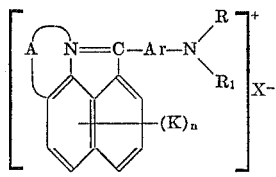

wherein A is —$CH_2$—$CH_2$—$CH_2$—,

—$CH_2$—$\overset{C_6H_5}{\underset{|}{C}H}$—, —$CH_2$—$CH_2$— or $CH_2$—$\overset{CH_3}{\underset{|}{C}H}$—

R and $R_1$ are lower alkyl, substituted lower alkyl, monocyclic aryl, aralkyl and if taken together are

—$CH_2$—$CH_2$—$CH_2$—$CH_2$—$CH_2$—
$CH_2$—$CH_2$—$CH_2$—$CH_2$— or —$CH_2$—$CH_2$—NH—$CH_2$—$CH_2$—; Ar is a monocyclic or bicyclic aromatic ring; X is an anion used for salt formation of basic dyestuffs; K is hydrogen, chlorine, bromine, lower alkyl, lower alkoxy, amino or nitrile; and n is 1 or 2; the dyestuff being free of sulfonic acid, carboxylic acid or disulfimide groups.

---

The present invention relates to novel dyestuffs; more particularly it relates to dyestuffs of the formula

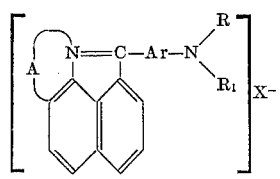

in this formula A stands for the residual members of a 5- or 6-membered ring containing nitrogen and A and the naphthalene ring may exhibit non-ionic substituents, Ar denotes an aromatic radical, and R and $R_1$ represent alkyl, cycloalkyl, aryl or aralkyl radicals, where the alkyl radicals may also conjointly form the constituent of a saturated heterocyclic ring system and Ar and R as well as $R_1$ may exhibit non-ionic substituents; the dyestuffs are free of sulfonic acid, carboxylic acid and disulfimide groups; X stands for the residue of an anion usual in basic dyestuffs, e.g. Cl⁻, Br⁻, the acetate, hydrogen sulfate, phosphate or sulfate radical.

The novel dyestuffs are obtained when compounds of the general formula

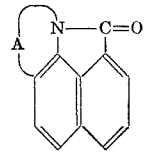

wherein A has the above identified meaning and wherein A and the naphthalene ring may exhibit non-ionic substituents, are heated with amines of the general formula

wherein Ar as well as R and $R_1$ have the above identified meaning and wherein those radicals as well as the naphthalene ring may exhibit non-ionic substituents, in the presence of condensing agents having a water eliminating activity.

The following are for instance suitable compounds of the general Formula II: cyclic lactams of the formula

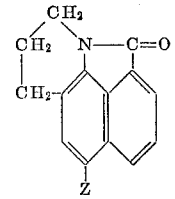

wherein Z denotes hydrogen, chlorine, bromine, an acetylamino, p-toluene-sulfonylamino, dimethylamino, methoxy, ethoxy, phenoxy, acetyl, methyl or ethyl group, and the cyclic lactams of the formula

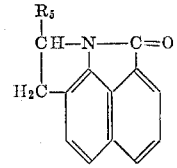

wherein $R_5$ denotes hydrogen or a methyl or phenyl group.
These compounds can for instance be obtained by reacting compounds of the formula

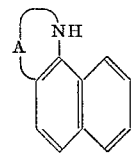

wherein A has the above specified significance and A and the naphthalene ring may contain non-ionising substituents, with phosgene in inert solvents or diluents followed by treatment with Friedel-Crafts catalysts.

Suitable compounds of Formula III are, inter alia, N,N-dimethylaniline, N,N-diethylaniline, N-n.butyl - N - β-chloro-ethyl-aniline, 2-ethoxy-N,N - dimethylaniline, 3-methyl-dimethylaniline, N - methyl - diphenylamine, N-ethyl-diphenylamine, N-methyl-4-ethoxy-diphenylamine, N-ethyl-4-ethoxy-diphenylamine, 1-dimethylamino-naphthalene and 1-diethylamino-naphthalene.

The following can for instance be considered as condensing agents having a water-eliminating activity: the halides of the acids of phosphorus such as phosphorus oxychloride, phosphorus oxybromide, phosphorus pentacloride and phosphorus trichloride, as well as sulphuryl and thionyl chloride and also phosgene, stannic chloride, titanium tetrachloride, zinc chloride, aluminium chloride, boron trifluoride and silicon tetrachloride, or their mixtures.

In order to carry out the process according to the invention, it is possible to proceed by heating the cyclic lactam (II) with the amine (III) to a temperature between 70 and 150° C. optionally in a diluent, and then adding the condensing agent. It is also possible first to heat the lactam with the condensing agent and thereafter to add the amine; lower temperatures are frequently satisfactory for this form of execution, for instance those from 30 to 100° C. However, it will in general be sufficient to apply the amount of amine in equimolar proportions relative to the lactam, although it may also be possible to employ an excess, when the excess may be selected to be large enough for the amine to serve as the solvent. In addition, chloroform, 1,2-dichloroethane, 1,1,2,2-tetrachloroethane, nitrobenzene, chlorobenzene and the isomeric di- and trichlorobenzenes are suitable as diluents, as well as phosphorus oxychloride and thionyl chloride.

Suitable non-ionic substituents which may be present in the naphthalene ring and/or in the arylene residue Ar are, for instance, halogen atoms, such as fluorine, chlorine and bromine, lower alkyl and lower alkoxy groups, such as the methyl, ethyl, isopropyl, methoxy and ethoxy groups, nitro and amino groups, acyl radicals and sulphonamide groups as well as non-ionic derivatives of carboxyl groups such as carboxylic acid ester, carboxylic acid amide and nitrile groups.

It has to be understood that the type of the anion X usual in basic dyestuffs does not effect the dyeing properties of the novel dyestuffs. From their preparation the dyestuffs will normally exhibit anions like halide anions, in particular Cl⁻ and/or Br⁻, or sulfonate groups, such as —OSO₃CH₃⁻ or —OSO₃C₂H₅⁻ or p-toluene sulfonate; in general, the nature of the anion depends on the mode of production, purification and/or precipitation of the dyestuff. The anion can, however, be replaced by other anions normally encountered in dyestuff salts of basic dyestuffs by methods known as such; for this purpose the dyestuff salt is first converted into the free base by neutralizing it with a basic reagent, such as sodium carbonate, sodium hydroxide and the like, and when this base is then converted into the form of the desired salt with the corresponding organic or inorganic acid by means of this procedure, it is possible to obtain dyestuff salts which contain, for example, [BF₄]⁻, benzene sulfonate, phosphate, acetate, chloro zincate, perchlorate, nitrate, sulfate, oxalate, formate, citrate, maleinate, tartrate, benzoate, lactate, propionate, butyrate or succinate radicals as the anions.

The novel dyestuffs are particularly suitable for dyeing, printing and spin dyeing of materials which consist wholly or predominantly, in general by more than 85%, of polymerised acrylonitrile or vinylidene cyanide. In this connection it is remarkable that when mixtures of such materials with wool are dyed the animal fibre is hardly coloured. A particular advantage of the dyestuffs prepared according to the invention consists in their high dyeing yield which makes possible the production of very deep dyeings and prints. The dyeings and prints have excellent fastness properties, particularly towards light, pressing, sublimation and washing, and they are characterised by uniformity of the applied dyeing and a high lustre. The novel dyestuffs are also suitable for dyeing and printing on tanned cotton, on cellulose esters such as cellulose acetate and on paper materials, as well as for the production of inks or of pastes for ball point pens.

Except where otherwise specified the parts stated in the following examples, which are given for the purpose of illustrating the invention, are parts by weight.

Example 1

10.5 parts of the cyclic lactam of the formula

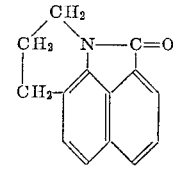

and 11.4 parts of 4-ethoxy-N-methyl-diphenylamine are heated at 90 to 100° C. for 20 to 24 hours with 30 parts of 1,2-dichlorobenzene and 40 to 50 parts of phosphorus oxychloride, whilst stirring. The excess of phosphorus oxychloride is then decomposed by the dropwise addition of water, the dichlorobenzene is expelled with steam and the crude dyestuff which had almost completely separated on cooling of the residual aqueous suspension is recrystallised from 750 to 1000 parts of water. The dyestuff is salted out from the cooled filtrate by the addition of about 50 parts of a saturated solution of sodium chloride. Its composition corresponds to the formula

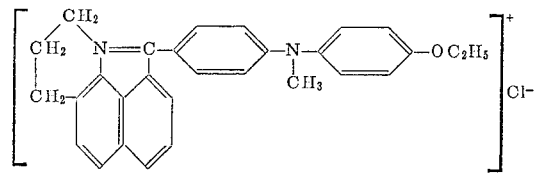

and it dyes polyacrylonitrile materials strongly bluish violet shades with excellent fastness properties.

The cyclic lactam had been prepared as follows:

90 parts of 7,8-benzo-quinoline are dissolved in 350 parts by volume of dioxan and hydrogenated at 70° C. with hydrogen at a pressure of 100 atmospheres after 12.3 parts of Raney nickel had been added to it. Absorption of hydrogen is complete after 21 hours. The catalyst is filtered off, dioxan is distilled off and the residue is distilled in vacuo. 88.6 parts of 1,2,3,4-tetrahydro-7,8-benzo-quinoline of B.P. 110–123° C./0.2 mm. Hg are obtained. The compound melts at 41–43° C. after it has been recrystallised from ligroin.

78.0 parts of 1,2,3,4-tetrahydro-7,8-benzo-quinoline are dissolved in 280 parts by volume of o-dichlorobenzene and phosgene is passed in at 160° C. for 3½ hours. Air is then passed through the reaction mixture at 140° C. for 3 hours. 220 parts by volume of o-dichlorobenzene are distilled off and the resultant carbamic acid chloride is introduced into a suspension of 106.8 parts of anhydrous aluminium chloride in 154 parts by volume of o-dichlorobenzene heated to 140° C. It is stirred at 140° C. for 50 minutes, allowed to cool to 40° C. and the reaction mixture is added to 300 parts of ice water. The organic phase is separated, the aqueous phase is thoroughly shaken with o-dichlorobenzene and the combined solutions in o-dichlorobenzene are washed with 10% sodium carbonate solution and with water. When the solution has been dried over sodium sulphate, o-dichlorobenzene is distilled off in vacuo and the residue distilled in a high vacuum. 78.2 parts of a compound of the formula

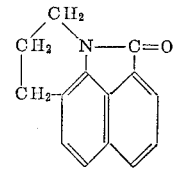

pass over at 176 to 223° C./0.25 mm. Hg. After recrystallisation from alcohol the compound melts at 126 to 128° C.

When an equivalent amount of one of the following tertiary amines is in each case employed in the place of 4-ethoxy-N-methyl-diphenylamine during this example, equally valuable and very fast dyestuffs are again obtained when the procedure is otherwise unchanged.

| Amine: | Colour shade of dyeing on polyacrylonitrile |
|---|---|
| N-methyl-diphenylamine | Bluish violet. |
| N-ethyl-diphenylamine | Bluish violet. |
| N - methyl - 4 - methyl - diphenylamine | Bluish violet. |
| N - methyl - 4 - methoxy - diphenylamine | Strongly bluish violet. |
| N - methyl - 4 - dimethylamino-diphenylamine | Blue. |
| N - ethyl - 4 - diethylamino-diphenylamine | Blue. |
| N - methyl - 2 - ethoxy - diphenylamine | Violet. |
| N - ethyl - 3 - methoxy - diphenylamine | Bluish violet. |
| N - methyl - 4 - chloro - diphenylamine | Violet. |
| N - methyl - 3,4 - dimethoxy-diphenylamine | Strongly reddish blue. |
| N,N-dibenzyl-aniline | Violet. |

Example 2

58 parts of the cyclic lactam of the formula and 46 parts of 4-ethoxy-N-methyl-diphenylamine are heated at 90 to 100° C. for 20 hours with 200 parts of 1,2-dichlorobenzene and with 420 parts of phosphorus oxychloride. After the excess of phosphorus oxychloride has been decomposed by the careful dropwise addition of water, the dichlorobenzene is distilled off in steam. The dyestuff of the formula which separates during this operation can be purified by recrystallisation from water or from dilute acetic acid. It gives a blue dyeing on polyacrylonitrile with very good fastness to light. The cyclic lactam employed in this example had been prepared as follows:

20.9 parts of the cyclic lactam described in Example 1 are dissolved in 110 parts of chlorobenzene. A mixture of 16 parts of bromine and 25 parts of chlorobenzene is allowed to run into this solution at 110 to 125° C. The bromination mixture is then stirred at 120 to 125° C. for another 30 minutes and it is thereafter heated to boiling for approximately another hour. An aqueous suspension of the bromo-lactam of the above stated formula is obtained by distilling off the chlorobenzene in steam, and this melts at 162 to 164° C. after recrystallisation from acetonitrile.

Example 3

58 parts of the cyclic lactam employed in Example 2 and 30 parts of N,N-diethylaniline are heated with 100 parts of 1,2-dichlorobenzene and with 150 to 175 parts of phosphorus oxychloride. 30 parts of anhydrous aluminium chloride are introduced by portions between 70 and 85° C. whilst stirring well and the pulpy mixture is stirred at 85 to 95° C. for another 10 to 15 hours. Whilst it is still warm the mass is then placed into 7000 parts of water at 60 to 70° C., stirred at 90 to 95° C. with 5 to 10 parts of active charcoal for about 10 minutes and filtered off with suction whilst hot. After it has cooled, the filtrate is treated with 100 parts of sodium chloride, when the dyestuff of the formula separates. The dyestuff is suitable for dyeing and printing on polyacrylonitrile to give reddish blue shades.

When an equivalent amount of N,N-dimethylaniline is employed in place of the diethylaniline, a strongly reddish blue dyestuff with similar coloristic properties is obtained.

Example 4

24.4 parts of the lactam of the formula and 16.5 parts of N-phenylpiperidine are heated at 90 to 100° C. for 24 hours with 75 parts of phosphorus oxychloride. The melt is cooled, decomposed with water and the crude dyestuff filtered off with suction. The dyestuff can be purified with the addition of charcoal by recrystallizing from water. It corresponds to the formula and dyes polyacrylnitrile reddish blue.

If using instead of the N-phenylpiperidine the equivalent amount of

N-phenyl-pyrrolidine,
N-phenyl-morpholine,
N,N-diisopropyl-aniline,
N-methyl-N-isopropyl-aniline,
N,N-di-n-butyl-aniline,
N-cyclohexyl-N-methylaniline,
N-n-butyl-N-β-chloroethyl-aniline,
N-di-β-chloroethyl-aniline,
N-methyl-N-β-cyanoethyl-aniline,
N-ethyl-N-β-methoxyethyl-aniline,
N-methyl-N-β-bromoethyl-aniline or
2-ethyl-N,N,-dimethylaniline valuable blue-violet to reddish blue dyestuffs are likewise obtained.

The chlorine containing lactam of this example was produced in the following manner:

105 parts of the cyclic lactam used in Example 1 are heated at the boil for one hour with 400 parts of carbon tetrachloride and 70 parts of sulfuryl chloride. After cooling and filtering off with suction the crude chlorination product (about 100 parts) is recrystallized from methanol. It melts at 161° C.

What is claimed is:

1. A dyestuff of the formula:

$$\left[ \begin{array}{c} A \diagdown N=C-Ar-N \diagup R \\ \diagdown R_1 \\ \text{(naphthalene ring with K)} \end{array} \right]^+ X^-$$

wherein A is selected from the group consisting of

—CH$_2$CH$_2$CH$_2$—

—CH$_2$CH— , —CH$_2$CH$_2$— and —CH$_2$CH—
      |                                      |
      C$_6$H$_5$                             CH$_3$ R and R$_1$ when taken alone are selected from the group consisting of lower alkyl, halo lower alkyl, monocyclic aryl and aralkyl, and when taken together from the group consisting of —CH$_2$CH$_2$CH$_2$CH$_2$CH$_2$—,

—CH$_2$CH$_2$CH$_2$CH$_2$— and —CH$_2$CH$_2$NHCH$_2$CH$_2$—; Ar is selected from the group consisting of phenylene, naphthylene, and mono-substituted phenylene or naphthylene wherein the substituent is selected from the group consisting of hydrogen, lower alkyl, lower alkoxy, chlorine, bromine, fluorine, amino, acyl, sulfonamide, carboxylic acid ester, carboxylic acid amide and nitrile groups; X is an anion used for salt formation of basic dyestuffs; K is selected from the group consisting of hydrogen, chlorine, bromine, lower alkyl, lower alkoxy, amino and nitrile groups; said dyestuff being free of sulfonic acid, carboxylic acid and disulfimide groups.

2. A dyestuff of the formula:

$$\left[ \begin{array}{c} \text{CH}_2 \\ \text{CH}_2 \diagdown N=C-\diagdown \diagup -N \diagup R \\ \text{CH}_2 \diagup \qquad \qquad \diagdown R_1 \\ \text{(naphthalene with L, B)} \end{array} \right]^+ X^-$$

wherein L is selected from the group consisting of H, Br and Cl; B is selected from the group consisting of hydrogen, lower alkyl, lower alkoxy, clorine, bromine, fluorine, nitro, amino, acyl, sulfonamide, carboxylic acid ester, carboxylic acid amide and nitrile groups; R and R$_1$ are selected from the group consisting of lower alkyl, halo lower alkyl, monocyclic aryl, aralkyl and, if taken together, are a member selected from the group consisting of —CH$_2$CH$_2$CH$_2$CH$_2$CH$_2$—, —CH$_2$CH$_2$CH$_2$CH$_2$— and —CH$_2$CH$_2$—NH—CH$_2$CH$_2$— and X is an anion used for salt formation of basic dyestuffs, the dyestuffs being free of sulfonic acid, carboxylic acid and disulfimide groups.

3. The dyestuff of claim 2 wherein B is lower alkyl.

4. The dyestuff of claim 2 wherein B is lower alkoxy.

5. The dyestuff of the formula

[structure with CH$_2$/CH$_2$/CH$_2$-N=C-phenyl-N(CH$_3$)$_2$ on naphthalene]

6. The dyestuff of the formula

[structure with CH$_2$/CH$_2$/CH$_2$-N=C-phenyl-N(C$_2$H$_5$)$_2$ on naphthalene]

7. The dyestuff of the formula

[structure with CH$_2$/CH$_2$/CH$_2$-N=C-phenyl-N(CH$_3$)(C$_6$H$_5$) on naphthalene]

8. The dyestuff of the formula

[structure with CH$_2$/CH$_2$/CH$_2$-N=C-phenyl-N(C$_6$H$_5$)$_2$ on naphthalene]

9. The dyestuff of the formula

[structure with CH$_2$/CH$_2$/CH$_2$-N=C-phenyl-N(CH$_3$)-phenyl-OCH$_3$ on naphthalene]

10. The dyestuff of the formula

[structure with CH$_2$/CH$_2$/CH$_2$-N=C-phenyl-N(CH$_3$)-phenyl-OC$_2$H$_5$ on naphthalene]

11. The dyestuff of the formula

[structure with CH$_2$/CH$_2$/CH$_2$-N=C-phenyl-N(C$_2$H$_5$)-phenyl-OCH$_3$ on naphthalene]

12. The dyestuff of the formula

[structure with CH$_2$/CH$_2$/CH$_2$-N=C-phenyl-N(C$_2$H$_5$)-phenyl-OC$_2$H$_5$ on naphthalene]

13. The dyestuff of the formula

[structure with CH$_2$/CH$_2$/CH$_2$-N=C-phenyl-N(C$_2$H$_5$)$_2$ on Cl-naphthalene]

14. The dyestuff of the formula

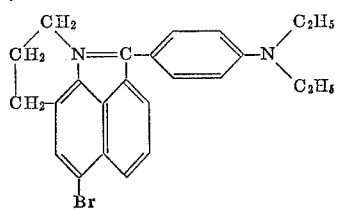

15. A dyestuff of the formula:

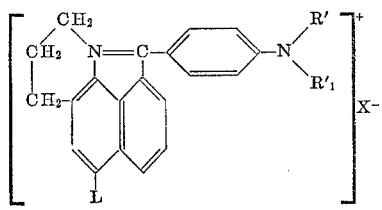

wherein L is selected from the class consisting of H, Br and Cl, $R'_1$ is selected from the class consisting of lower alkyl having 1 to 2 carbon atoms, chloroethyl and cyanoethyl, and X is an anion used for salt formation of basic dyestuffs, the dyestuff being free of sulfonic acid, carboxylic acid and disulfimide groups.

16. A dyestuff of the formula:

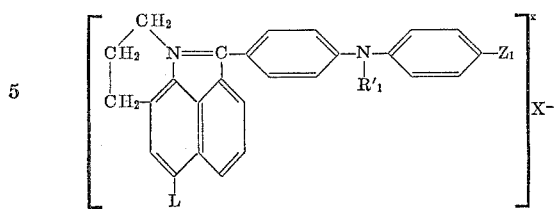

wherein L is selected from the class consisting of H, Br and Cl, $R'_1$ is lower alkyl having 1 to 2 carbon atoms, $Z_1$ is selected from the class consisting of H, lower alkoxy having 1 to 2 carbon atoms and di lower alkylamino, the alkyl groups having 1 to 2 carbon atoms, and X is an anion used for salt formation of basic dyestuffs, the dyestuff being free of sulfonic acid, carboxylic acid and disulfimide groups.

References Cited

UNITED STATES PATENTS 3,090,782   5/1963   Coerner _____ 260—286 X

NICHOLAS S. RIZZO, *Primary Examiner.*

ALEX MAZEL, *Examiner.*

D. G. DAUS, *Assistant Examiner.*

UNITED STATES PATENT OFFICE
CERTIFICATE OF CORRECTION

Patent No. 3,391,148                                      July 2, 1968

Alfred Brack et al.

It is certified that error appears in the above identified patent and that said Letters Patent are hereby corrected as shown below:

Column 1, line 13, cancel "azo". Column 2, lines 18 and 19, cancel "as well as the naphthalene ring". Column 6, lines 8 to 17, the right-hand portion of the formula reading "-M($C_2H_5$)$_2$" should read -- -N($C_2H_5$)$_2$ --. Column 7, line 53, "clorine" should read -- chlorine --; line 63, "the dyestuffs" should read -- the dyestuff --. Column 10, lines 1 to 9, the right-hand portion of the formula, at the top of the large closing bracket, "x" should read -- + --.

Signed and sealed this 20th day of January 1970.

(SEAL)
Attest:

Edward M. Fletcher, Jr.                        WILLIAM E. SCHUYLER, JR.
Attesting Officer                              Commissioner of Patents